(12) United States Patent
Kazeto et al.

(10) Patent No.: US 11,883,988 B2
(45) Date of Patent: Jan. 30, 2024

(54) POLY(VINYL ALCOHOL) MOLD RELEASE FILM FOR ARTIFICIAL MARBLE MOLDING USE, AND METHOD FOR PRODUCING ARTIFICIAL MARBLE USING SAME

(71) Applicant: KURARAY CO., LTD., Okayama (JP)

(72) Inventors: Osamu Kazeto, Kurashiki (JP); Takashi Nerio, Kurashiki (JP); Masahiro Takafuji, Saijo (JP)

(73) Assignee: KURARAY CO., LTD., Okayama (JP)

( * ) Notice: Subject to any disclaimer, the term of this patent is extended or adjusted under 35 U.S.C. 154(b) by 500 days.

(21) Appl. No.: 17/274,261

(22) PCT Filed: Sep. 6, 2019

(86) PCT No.: PCT/JP2019/035112
§ 371 (c)(1),
(2) Date: Mar. 8, 2021

(87) PCT Pub. No.: WO2020/050394
PCT Pub. Date: Mar. 12, 2020

(65) Prior Publication Data
US 2021/0347094 A1    Nov. 11, 2021

(30) Foreign Application Priority Data

Sep. 7, 2018    (JP) .................................. 2018-168301

(51) Int. Cl.
*B29C 33/68*    (2006.01)
(52) U.S. Cl.
CPC .................................... *B29C 33/68* (2013.01)

(58) Field of Classification Search
CPC ...................................................... B29C 33/68
USPC ......................................................... 428/220
See application file for complete search history.

(56) References Cited

U.S. PATENT DOCUMENTS

2011/0201737 A1*   8/2011   Kato ....................... C08L 27/06
                                                                 524/399

FOREIGN PATENT DOCUMENTS

| JP | H04-364907 A | 12/1992 |
|---|---|---|
| JP | 2009-298038 A | 12/2009 |
| JP | 2011-104981 A | 6/2011 |
| JP | 5901193 B2 | 4/2016 |
| JP | 6033721 B2 | 11/2016 |
| KR | 10-0590311 B1 | 6/2006 |
| WO | 2012/132984 A1 | 10/2012 |
| WO | 2016/084836 A1 | 6/2016 |

OTHER PUBLICATIONS

International Search Report issued in corresponding International Patent Application No. PCT/JP2019/035112 dated Oct. 1, 2019.
Extended European Search Report issued in corresponding European Patent Application No. 19858522.6 dated May 11, 2022.

* cited by examiner

*Primary Examiner* — Tahseen Khan
(74) *Attorney, Agent, or Firm* — Morgan, Lewis & Bockius LLP

(57) ABSTRACT

Disclosed is a mold release film that is to be placed between a stock solution that serves as a raw material for artificial marble and a shaping apparatus when the stock solution is fed to the shaping apparatus, and then solidified and molded.

7 Claims, 3 Drawing Sheets

[FIG. 1]
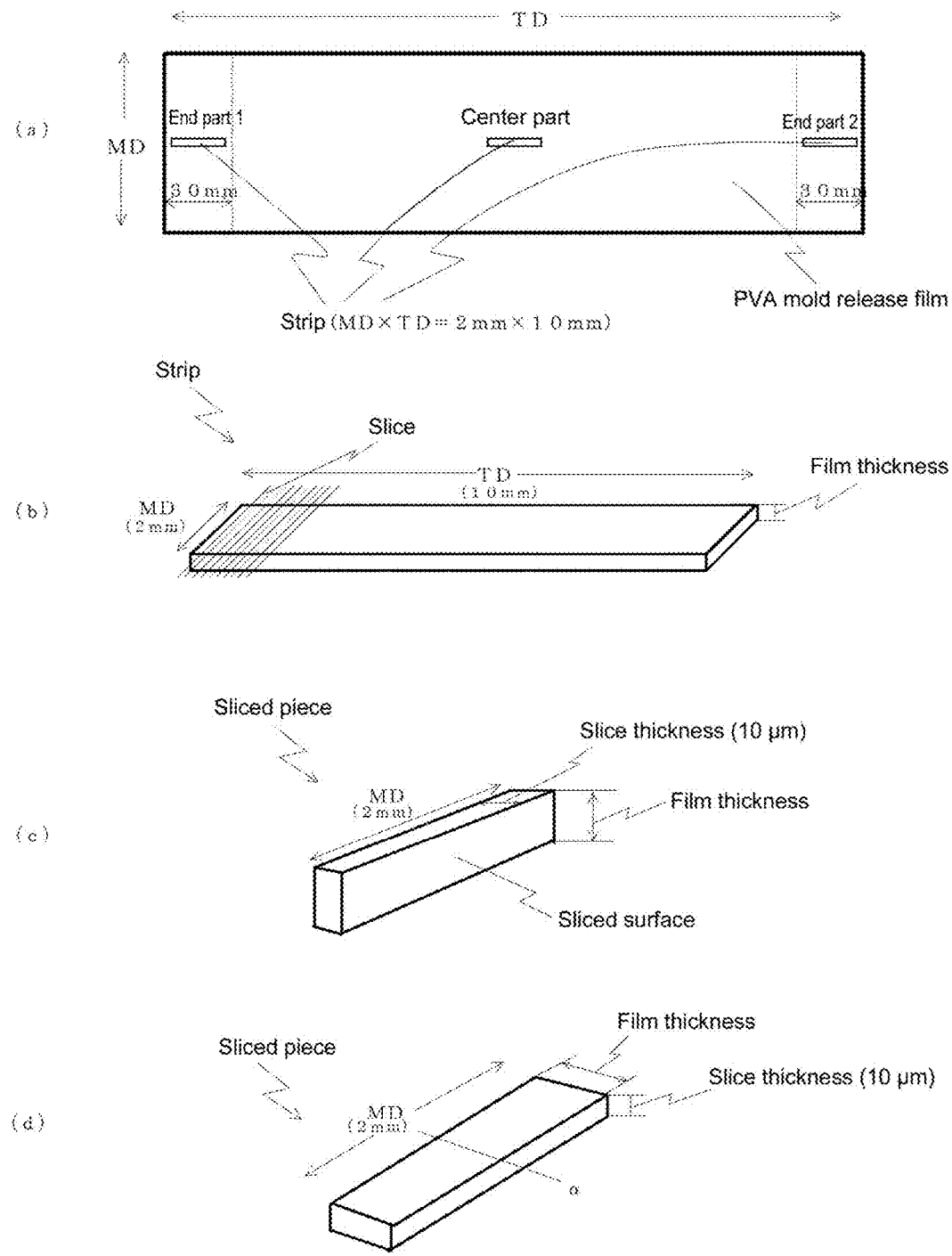

[FIG. 2]
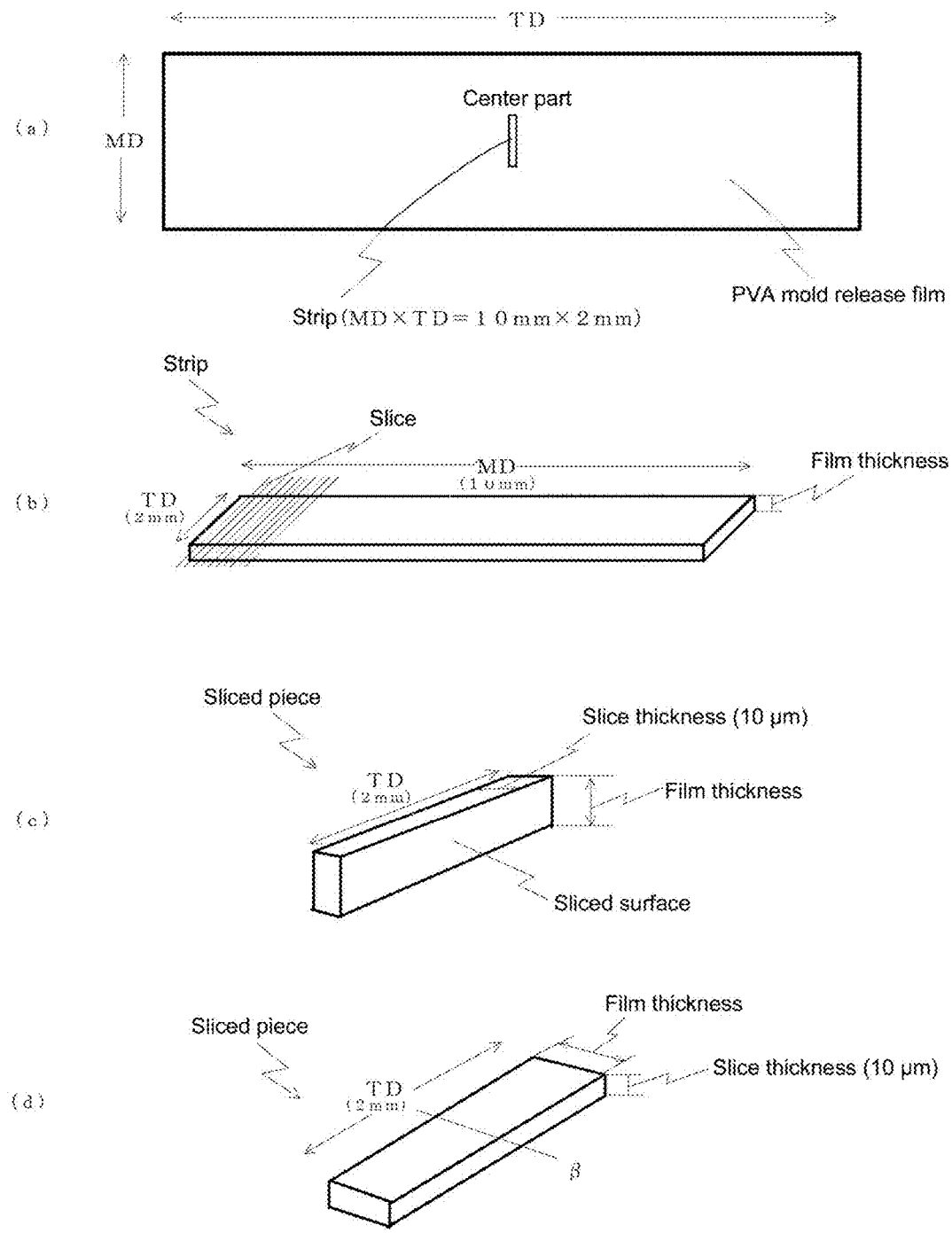

[FIG. 3]
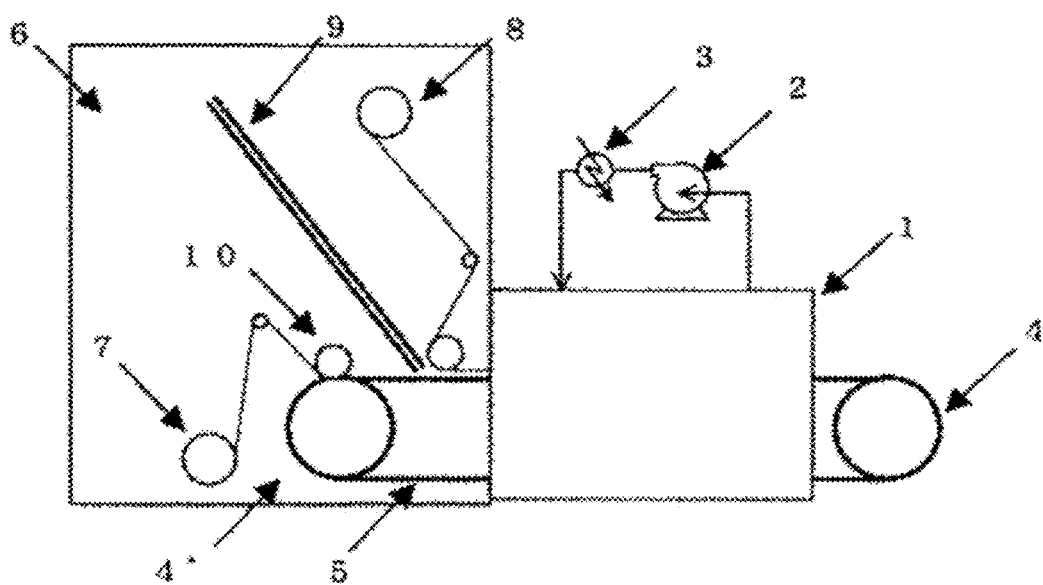

POLY(VINYL ALCOHOL) MOLD RELEASE FILM FOR ARTIFICIAL MARBLE MOLDING USE, AND METHOD FOR PRODUCING ARTIFICIAL MARBLE USING SAME

TECHNICAL FIELD

The present invention relates to a polyvinyl alcohol mold release film that is to be used, when solidifying and molding artificial marble with a shaping apparatus, as a mold release film that is placed between the artificial marble and the shaping apparatus in order to prevent the artificial marble from fixing to the shaping apparatus, and also relates to a method for producing artificial marble using the film.

BACKGROUND ART

As one of the methods for molding a plastic molded article, there is known a method comprising feeding a stock solution that serves as a raw material of the plastic molded article, to a shaping apparatus such as a mold, and then solidifying and molding it. In this method, if the plastic and the material of the shaping apparatus have high affinity, it becomes difficult to take out the plastic molded article from the shaping apparatus after the solidification and molding are completed, which may reduce the production speed and may cause increase in surface defects. As one of countermeasures, it is known to place a mold release film between the plastic molded article and the shaping apparatus.

The characteristics required for the mold release film are that it can be easily taken out from the shaping apparatus after solidification/molding of the plastic molded article, that it can be easily removed from the plastic molded article, that the mold release film has heat resistance during the step of solidification/molding of the plastic molded article, that the mold release film has flexibility to fit the shape of the shaping apparatus, and that the mold release film can follow the dimensional change in the step of solidification/molding of the plastic molded article.

It is known that polyvinyl alcohol (this may hereinafter be abbreviated as "PVA") film can be suitably used for molding artificial marble or the like containing an acrylic-based polymer or a polyester-based polymer as a main component because that film has the above-mentioned characteristics (Patent Literature 1).

As a method for continuously producing artificial marble being superior in productivity, there is known a method for producing artificial marble as disclosed in Patent Literature 1 that includes a step of feeding a resin raw material for the artificial marble onto a PVA mold release film that is attached to a metal endless belt and continuously supplied, and then conveying it into a heating oven to cure it.

This production method has a problem of lowering productivity because due to curls of end parts or wrinkles of the PVA mold release film caused by moisture absorption by the film, wrinkles are transferred to the surface of the artificial marble to cause poor shape, which leads to deterioration in product quality and troubles during processing or installation, so that a step of removing the wrinkles by grinding/polishing. As a countermeasure, Patent Literature 1 discloses a technique of adjusting the difference between the moisture content of the PVA mold release film to be used and the equilibrium moisture content at relative humidity in the step of feeding the resin raw material of artificial marble within ±0.5% by mass.

However, in recent years, there has been a demand for improved productivity of artificial marble and support for large products, and it has become clear that there is a problem that when wide artificial marble is produced using a PVA mold release film with an adjusted moisture content as described above, grinding/polishing of the artificial marble after curing is required due to wrinkles diagonally generated especially on both end parts.

PRIOR ART DOCUMENT

Patent Document

Patent Document 1: JP 2009-298038 A

SUMMARY OF THE INVENTION

Problems to be Solved by the Invention

It is an object of the present invention to provide a polyvinyl alcohol mold release film for artificial marble molding use capable of, even in the production of wide artificial marble, suppressing wrinkles or curls generated at both end parts to prevent the surface shape of the resulting artificial marble from being defective, and simplifying the step of grinding and polishing artificial marble, and a method for producing artificial marble using the same.

Means for Solving the Problems

That is, the present invention relates to

[1] a polyvinyl alcohol mold release film for artificial marble molding use, which is to be placed between a stock solution that serves as a raw material for artificial marble and a shaping apparatus when the stock solution is fed to the shaping apparatus, solidified and molded, the mold release film being characterized by being a polyvinyl alcohol film and satisfying the following formula (1), $$4.6\times10^{-3}\geq\Delta n(MD)_0-1.4\times10^{-3}\geq\Delta n(TD)_0\geq1.0\times10^{-3} \quad (1)$$

in the formula (1), $\Delta n(MD)_0$ represents a value determined from a birefringence index of the polyvinyl alcohol mold release film in the machine direction at the center part of the transverse direction of the film by averaging the birefringence index along the thickness direction of the film, and $\Delta n(TD)_0$ represents a value determined from a birefringence index of the polyvinyl alcohol mold release film in the transverse direction at the center part of the transverse direction of the film by averaging the birefringence index along the thickness direction of the film,

[2] the polyvinyl alcohol mold release film for artificial marble molding use according to [1], wherein the film satisfies the following formulas (2) to (4), $$3.0\times10^{-3}\geq\Delta n(MD)_1-\Delta n(MD)_0\geq0.01\times10^{-3} \quad (2)$$

$$3.0\times10^{-3}\geq\Delta n(MD)_2-\Delta n(MD)_0\geq0.01\times10^{-3} \quad (3)$$

$$1.5\times10^{-3}\geq|\Delta n(MD)_2-\Delta n(MD)_1| \quad (4)$$

in the formulas (2) and (3), $\Delta n(MD)_0$ has the same meaning as in the formula (1), and in the formulas (2) and (4), $\Delta n(MD)_1$ represents a value determined from a birefringence index of the polyvinyl alcohol mold release film in the machine direction at one end part of the transverse direction of the film by averaging the birefringence index along the thickness direction of the film, and in the formulas (3) and (4), $\Delta n(MD)_2$ is a value determined from a birefringence index of the polyvinyl alcohol mold release film in the machine direction at the other end part of the transverse direction of the film by averaging the birefringence index along the thickness direction of the film,

[3] the polyvinyl alcohol mold release film for artificial marble molding use according to [1] or [2], wherein a complete dissolution time when immersing the film in deionized water at 10° C. is within 300 seconds,

[4] the polyvinyl alcohol mold release film for artificial marble molding use according to any one of [1] to [3], wherein the degree of saponification of the polyvinyl alcohol forming the film is 64 to 93 mol %,

[5] the polyvinyl alcohol mold release film for artificial marble molding use according to any one of [1] to [4], wherein the artificial marble comprises at least one species selected from the group consisting of an acrylic-based polymer and a polyester-based polymer,

[6] the polyvinyl alcohol mold release film for artificial marble molding use according to any one of [1] to [5], wherein the width of the film is 1000 mm or more, and

[7] a method for producing artificial marble, wherein the artificial marble is continuously produced using the polyvinyl alcohol mold release film for artificial marble molding use according to any one of [1] to [6].

Effects of the Invention

By using the polyvinyl alcohol mold release film for artificial marble molding use of the present invention, wrinkles and curls to be generated at both end parts can be suppressed even in the production of wide artificial marble. Accordingly, it is possible to prevent the surface shape of the resulting artificial marble from being defective, and to simplify the step of grinding and polishing the artificial marble. In addition, by the production method of the present invention, wide artificial marble can be produced with high productivity.

BRIEF DESCRIPTION OF DRAWINGS

FIG. 1 illustrates a method for measuring the birefringence index "$\Delta n(MD)$" in the machine direction (MD) of a PVA mold release film.

FIG. 2 illustrates a method for measuring the birefringence index "$\Delta n(TD)$" in the transverse direction (TD) of a PVA mold release film.

FIG. 3 is a schematic view of the apparatus for producing artificial marble used in the present invention.

MODES FOR CARRYING OUT THE INVENTION

The present invention will be described in more detail below.

[PVA Mold Release Film]

It is important that the PVA mold release film for artificial marble molding use of the present invention (this may hereinafter be simply abbreviated as "PVA mold release film") satisfies the following formula (1).

$$4.6 \times 10^{-3} \geq \Delta n(MD)_0 - 1.4 \times 10^{-3} \geq \Delta n(TD)_0 \geq 1.0 \times 10^{-3} \quad (1)$$

in the formula (1), $\Delta n(MD)_0$ represents a value determined from a birefringence index of the polyvinyl alcohol mold release film in the machine direction at the center part of the transverse direction of the film by averaging the birefringence index along the thickness direction of the film, and $\Delta n(TD)_0$ represents a value determined from a birefringence index of the polyvinyl alcohol mold release film in the transverse direction at the center part of the transverse direction of the film by averaging the birefringence index along the thickness direction of the film.

It is not necessarily clear why even in the production of wide artificial marble suppress wrinkles and curls to be generated at both end parts can be suppressed by the PVA mold release film satisfying the above formula (1), but the present inventors have inferred as follows. That is, it is considered that the birefringence indexes in the machine direction and the transverse direction of a PVA mold release film correspond to the degrees of orientation in the machine direction and the transverse direction with respect to the thickness direction of the PVA mold release film, respectively, and it is considered that the higher the birefringence index, the higher the degree of orientation. Also, the reason is inferred that owing to satisfying the formula (1), the balance of shrinkage in the machine direction and the transverse direction of the PVA mold release film due to the heat applied during the production of artificial marble matches the balance of shrinkage of the artificial marble during solidification.

In the present invention, $\Delta n(MD)_0$ needs to be more than $\Delta n(TD)_0$ by $1.4 \times 10^{-3}$ or more. If this difference is less than $1.4 \times 10^{-3}$, it becomes difficult to suppress wrinkles and curls to be generated at both end parts. The difference between $\Delta n(MD)_0$ and $\Delta n(TD)_0$ is preferably $1.6 \times 10^{-3}$ or more, more preferably $1.8 \times 10^{-3}$ or more, even more preferably $2.0 \times 10^{-3}$ or more, and particularly preferably $2.1 \times 10^{-3}$ or more. On the other hand, the upper limit of the difference between $\Delta n(MD)_0$ and $\Delta n(TD)_0$ is $5.0 \times 10^{-3}$ or less as is clear from the formula (1). Also, if the difference exceeds $5.0 \times 10^{-3}$, it becomes difficult to suppress wrinkles and curls to be generated at both end parts. The difference between $\Delta n(MD)_0$ and $\Delta n(TD)_0$ is preferably $4.5 \times 10^{-3}$ or less, more preferably $4.0 \times 10^{-3}$ or less, even more preferably $3.5 \times 10^{-3}$ or less, and particularly preferably $3.0 \times 10^{-3}$ or less.

In the present invention, the upper limit of $\Delta n(MD)_0$ is $6.0 \times 10^{-3}$ or less as is clear from the formula (1). When $\Delta n(MD)_0$ exceeds $6.0 \times 10^{-3}$, it will become difficult to suppress wrinkles and curls to be generated at both end parts even if the difference between $\Delta n(MD)_0$ and $\Delta n(TD)_0$ is $1.4 \times 10^{-3}$ or more. The upper limit of $\Delta n(MD)_0$ is preferably $5.5 \times 10^{-3}$ or less, more preferably $5.0 \times 10^{-3}$ or less, and even more preferably $4.5 \times 10^{-3}$ or less. Similarly, also when $\Delta n(TD)_0$ is less than $1.0 \times 10^{-3}$, it becomes difficult to suppress wrinkles and curls to be generated at both end parts. The lower limit of $\Delta n(TD)_0$ is preferably $1.2 \times 10^{-3}$ or more, more preferably $1.4 \times 10^{-3}$ or more, and even more preferably $1.6 \times 10^{-3}$ or more. It is not necessarily clear why it is difficult to suppress wrinkles and curls to be generated at both end parts when $\Delta n(MD)_0$ exceeds the upper limit or when $\Delta n(TD)_0$ is less than the lower limit, but the reason is inferred that the difference in shrinkage between the PVA mold release film and the artificial marble during the production of the artificial marble becomes excessively large.

In the present invention, the PVA mold release film preferably satisfies the following formulas (2) to (4), $$3.0 \times 10^{-3} \geq \Delta n(MD)_1 - \Delta n(MD)_0 \geq 0.01 \times 10^{-3} \quad (2)$$

$$3.0 \times 10^{-3} \geq \Delta n(MD)_2 - \Delta n(MD)_0 \geq 0.01 \times 10^{-3} \quad (3)$$

$$1.5 \times 10^{-3} \geq |\Delta n(MD)_2 - \Delta n(MD)_1| \quad (4)$$

in the formulas (2) and (3), $\Delta n(MD)_0$ has the same meaning as in the formula (1), and in the formulas (2)

and (4), $\Delta n(MD)_1$ represents a value determined from a birefringence index of the polyvinyl alcohol mold release film in the machine direction at one end part of the transverse direction of the film by averaging the birefringence index along the thickness direction of the film, and in the formulas (3) and (4), $\Delta n(MD)_2$ is a value determined from a birefringence index of the polyvinyl alcohol mold release film in the machine direction at the other end part of the transverse direction of the film by averaging the birefringence index along the thickness direction of the film.

The formulas (2) and (3) means that the average value of the birefringence index in the machine direction at an end part of the PVA mold release film is preferably $0.01 \times 10^{-3}$ or more than that at the center part of the PVA mold release film, and $3.0 \times 10^{-3}$ or less. Further, the formula (4) means that the difference between the average values of the birefringence indexes in the machine direction at both end parts of the PVA mold release film is preferably $1.5 \times 10^{-3}$ or less. As a result of the PVA mold release film satisfying the above formulas (2) to (4), it becomes easier to suppress wrinkles and curls to be generated at both end parts, and the occurrence of wrinkles at both end parts is made uniform, so that it becomes easy to make the amount of polishing for removing the wrinkles uniform at both end parts.

When in the formulas (2) and (3) the difference between $\Delta n(MD)_1$ and $\Delta n(MD)_0$ and the difference between $\Delta n(MD)_2$ and $\Delta n(MD)_0$ exceed $3.0 \times 10^{-3}$ or are less than $0.01 \times 10^{-3}$, wrinkles and curls to be generated at both end parts tend to gradually become difficult to suppress. The upper limits of the difference between $\Delta n(MD)_1$ and $\Delta n(MD)_0$ and the difference between $\Delta n(MD)_2$ and $\Delta n(MD)_0$ are more preferably $2.6 \times 10^{-3}$ or less, more preferably $2.3 \times 10^{-3}$ or less, and particularly preferably $2.3 \times 10^{-3}$ or less. Further, the lower limits of the difference between $\Delta n(MD)_1$ and $\Delta n(MD)_0$ and the difference between $\Delta n(MD)_2$ and $\Delta n(MD)_0$ are more preferably $0.05 \times 10^{-3}$ or more, even more preferably $0.1 \times 10^{-3}$ or more, and particularly preferably $0.2 \times 10^{-3}$ or more.

When the difference between $\Delta n(MD)_1$ and $\Delta n(MD)_2$ exceeds $1.5 \times 10^{-3}$ in the formula (4), the balance at both end parts of the film is impaired, and there is exhibited a tendency that wrinkles and curls are impaired at one end part of the film. The difference between $\Delta n(MD)_1$ and $\Delta n(MD)_2$ is more preferably $1.0 \times 10^{-3}$ or less, even more preferably $0.5 \times 10^{-3}$ or less, and particularly preferably $0.1 \times 10^{-3}$ or less. The difference between $\Delta n(MD)_1$ and $\Delta n(MD)_2$ may be 0.

As the PVA that forms the PVA mold release film in the present invention, one produced by saponifying a vinyl ester-based polymer obtained by polymerizing a vinyl ester-based monomer may be used. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate; of these, vinyl acetate is preferable.

The vinyl ester-based polymer is preferably one obtained by using only a single type or two or more types of vinyl ester-based monomer as a monomer, and one obtained by using only a single type of vinyl ester-based monomer as a monomer is more preferable, but the polymer may be a copolymer of a single type or two or more types of vinyl ester-based monomer and another monomer copolymerizable therewith.

Examples of said another monomer copolymerizable with the vinyl ester-based monomer include: ethylene; olefins having 3 to 30 carbon atoms such as propylene, 1-butene, and isobutene; acrylic acid or a salt thereof; acrylates such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid or a salt thereof; methacrylates such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide, acrylamide derivatives such as N-methylacrylamide, N-ethylacrylamide, N,N-dimethylacrylamide, diacetoneacrylamide, acrylamide propanesulfonic acid or a salt thereof, acrylamidopropyldimethylamine or a salt thereof, and N-methylolacrylamide or a derivative thereof; methacrylamide, methacrylamide derivatives such as N-methylmethacrylamide, N-ethylmethacrylamide, methacrylamide propanesulfonic acid or a salt thereof, methacrylamidopropyldimethylamine or a salt thereof, and N-methylolmethacrylamide or a derivative thereof; N-vinylamides such as N-vinylformamide, N-vinylacetamide, and N-vinylpyrrolidone; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; vinyl cyanide such as acrylonitrile and methacrylonitrile; vinyl halides such as vinyl chloride, vinylidene chloride, vinyl fluoride, and vinylidene fluoride; allyl compounds such as allyl acetate and allyl chloride; maleic acid or a salt, ester or anhydride thereof; itaconic acid or a salt, ester or anhydride thereof; vinylsilyl compounds such as vinyltrimethoxysilane; and isopropenyl acetate. The vinyl ester-based polymer described above may have structural units derived from a single type or two or more types of such another monomer.

The ratio of the structural units derived from said another monomer to the vinyl ester-based polymer is preferably 15 mol % or less, and more preferably 5 mol % or less, based on the number of moles of all the structural units constituting the vinyl ester-based polymer.

The degree of polymerization of PVA is not particularly limited, but is preferably 200 or more, and preferably 5000 or less. When the degree of polymerization is less than 200, the film strength tends to decrease, and when the degree of polymerization exceeds 5,000, the production cost of PVA tends to increase. The degree of polymerization of PVA is more preferably in the range of 300 to 3,000. Here, the degree of polymerization means the average degree of polymerization measured according to the description of JIS K 6726-1994, and it is determined using the following formula from the limiting viscosity [η] (unit: deciliter/g) measured in water at 30° C. after resaponifying and purifying the PVA-based polymer.

$$\text{Degree of polymerization } (Po) = ([\eta] \times 10^4 / 8.29)^{(1/0.62)}$$

In the present invention, the degree of saponification of PVA is preferably 64 to 93 mol %. By adjusting the degree of saponification within this range, it becomes possible to easily peel off or dissolve and remove a PVA mold release film when removing the mold release film from solidified artificial marble. The degree of saponification of PVA is more preferably 70 to 91 mol %, and even more preferably 75 to 90 mol %. Here, the degree of saponification of PVA refers to the ratio (mol %) for which the vinyl alcohol units of the PVA account in the total number of moles of the structural units capable of being converted into vinyl alcohol units by saponification (typically, vinyl ester-based monomer units) and the vinyl alcohol units of the PVA. The degree of saponification of PVA can be measured according to the description of JIS K 6726-1994.

For the PVA mold release film in the present invention, a single type of PVA may be used as the PVA, or two or more types of PVA differing from each other in degree of polymerization, degree of saponification, degree of modification, or the like may be blended and used.

PVA mold release films are more rigid than other plastic films when containing no plasticizer, and there may be problems with mechanical properties such as impact strength, process passability during secondary processing, and so on. In order to prevent these problems, it is preferable that the PVA mold release film of the present invention contains a plasticizer. Preferable plasticizers include polyhydric alcohols, and specific examples thereof include ethylene glycol, glycerin, propylene glycol, diethylene glycol, triethylene glycol, tetraethylene glycol, and trimethylolpropane. These plasticizers may be used singly or two or more species of them may be used in combination. Of these plasticizers, ethylene glycol or glycerin is preferable. The content of the plasticizer in the PVA mold release film is preferably in the range of 1 to 30 parts by mass, more preferably in the range of 3 to 25 parts by mass, and even more preferably in the range of 5 to 20 parts by mass, per 100 parts by mass of the PVA contained in the PVA mold release film. When the content is less than 1 part by mass, the above problems tend to occur, and when it exceeds 30 parts by mass, the film is excessively flexible and the handleability may be deteriorated.

The PVA mold release film of the present invention preferably contains a surfactant for the purpose of improving the releasability from artificial marble and the handling property during the production of the PVA mold release film. The type of the surfactant is not particularly limited, and examples thereof include anionic surfactants and nonionic surfactants. A single type of surfactant may be used alone, or two or more types of surfactant may be used in combination.

Examples of the anionic surfactant include: a carboxylic acid type such as potassium laurate; a sulfate ester type such as octyl sulfate; and a sulfonic acid type such as dodecylbenzene sulfonate.

Examples of the nonionic surfactant include: an alkyl ether type such as polyoxyethylene oleyl ether; an alkylphenyl ether type such as polyoxyethylene octylphenyl ether; an alkyl ester type such as polyoxyethylene laurate; an alkylamine type such as polyoxyethylene laurylamino ether; an alkylamide type such as polyoxyethylene lauramide; a polypropylene glycol ether type such as polyoxyethylene polyoxypropylene ether; an alkanolamide type such as lauric acid diethanolamide and oleic acid diethanolamide; and an allyl phenyl ether type such as polyoxyalkylene allyl phenyl ether.

The PVA mold release film of the present invention may contain, in addition to plasticizers and surfactants, such components as moisture, antioxidants, ultraviolet absorbers, lubricants, crosslinking agents, colorants, fillers, preservatives, fungicides, and other polymers, as long as the effects of the present invention are not impaired. The ratio of the total mass of the PVA, the plasticizer, and the surfactant to the total mass of the PVA mold release film of the present invention is preferably in the range of 60 to 100% by mass, more preferably in the range of 80 to 100% by mass, and even more preferably in the range of 90 to 100% by mass.

[Complete Dissolution Time of PVA Mold Release Film]

The PVA mold release film of the present invention preferably has a complete dissolution time of 300 seconds or less when immersed in deionized water at 10° C. When the complete dissolution time is within 300 seconds, it is possible to dissolve and remove the PVA mold release film from the artificial marble after curing. The complete dissolution time is more preferably 180 seconds or less, even more preferably 120 seconds or less, and particularly preferably 90 seconds or less. On the other hand, the lower limit of the complete dissolution time is not particularly limited, but it is preferably 5 seconds or longer, more preferably 10 seconds or longer, even more preferably 20 seconds or longer, and particularly preferably 30 seconds or longer because a PVA mold release film whose complete dissolution time is excessively short tends to cause problems such as blocking between films due to absorption of moisture in the air atmosphere and decrease in film strength.

In the present invention, the complete dissolution time when a PVA mold release film is immersed in water at 10° C. can be measured as follows.

<1> Place a PVA mold release film in a constant temperature and humidity chamber adjusted to 20° C. and 65% RH for 16 hours or more to control the moistness.

<2> Cut a rectangular sample with a length of 40 mm and a width of 10 mm out of the moistness-controlled film, and sandwich and fix the sample between two plastic plates each size in 50 mm×50 mm and provided with a rectangular window (hole) having a length of 35 mm and a width of 23 mm such that the longitudinal direction of the sample is parallel to the longitudinal direction of the window and the sample is located substantially in the center in the transverse direction of the window.

<3> Put 300 ml of water in a 500 ml beaker and adjust the temperature of the water to 10° C. with the water while stirring the water with a magnetic stirrer equipped with a 3 cm long bar at a rotation speed of 280 rpm.

<4> Immerse the sample fixed to the plastic plates in <2> above in the beaker while being careful not to allowing the sample to touch the bar of the magnetic stirrer.

<5> Measure the time from the immersion in water until the sample piece dispersed in water completely disappear.

The complete dissolution time can be easily brought into the above-mentioned range by appropriately adjusting the type of the PVA to be used (degree of polymerization, degree of saponification, type and amount of modification, etc.), the film thickness, the type and amount of additives such as plasticizer, the film forming method and its conditions thereof, etc. Specifically, the dissolution time can be shortened by making adjustment to the PVA to be used, for example, lowering the degree of polymerization; lowering the degree of saponification; employing a more hydrophilic modification species (the type of structural unit derived from another monomer copolymerizable with the vinyl ester-based monomer described above); and increasing the amount of modification, or by making adjustment such as reducing the thickness of the PVA mold release film; adopting a more hydrophilic plasticizer; increasing the content of the plasticizer, and weakening the heat treatment conditions for the film.

The thickness of the PVA mold release film of the present invention is not particularly limited, but it is preferably 200 µm or less, more preferably 150 µm or less, even more preferably 100 µm or less, and further preferably 50 µm or less because if the film is excessively thick, the film tends to be difficult to fit the shape of the shaping apparatus. The thickness is preferably 5 µm or more, more preferably 10 µm or more, even more preferably 15 µm or more, and particularly preferably 20 µm or more because if the thickness is excessively small, problems may occur in the handling property and strength of the PVA mold release film. The thickness of the PVA mold release film can be determined by measuring the thickness at arbitrary 10 points (for example, arbitrary 10 points on a straight line drawn in the longitudinal direction of the PVA mold release film) and calculating the average value of the measurements.

The length of the PVA mold release film of the present invention is not particularly limited, but in the case where the PVA mold release film is used for a method for continuously producing artificial marble by attaching the PVA mold release film to a metal endless belt and feeding a resin raw material of the artificial marble onto the PVA mold release film, it is preferably an elongated length from the viewpoint of productivity. Specifically, it is preferably 50 m or more, more preferably 100 m or more, even more preferably 200 m or more, and particularly preferably 500 m or more. On the other hand, the upper limit of the length of the PVA mold release film is not particularly limited, but the length is preferably 10,000 m or less.

The width of the PVA mold release film of the present invention is preferably 1000 mm or more because the effect of the present invention can be obtained more remarkably. On the other hand, the upper limit of the width of the PVA mold release film is not particularly limited, but the width is preferably 5000 mm or less.

[Method of Forming PVA Mold Release Film]

In the present invention, the method for forming the PVA mold release film is not particularly limited, and it can be produced by an arbitrary method, for example, a method of forming a film by a cast film-forming method, a wet film-forming method (discharge into a poor solvent), a dry-wet film-forming method, a gel film-forming method (a method in which a film-forming stock solution is once cooled and gelled, and then the solvent is extracted and removed to obtain a PVA-based polymer film) or a combination thereof using a film-forming stock solution prepared by adding solvent, additives, etc. to PVA to homogenize them, or a melt-extrusion film-forming method in which the above-mentioned film-forming stock solution is prepared by using an extruder or the like, and this is extruded from a T-die or the like. Among these, the cast film-forming method and the melt-extrusion film-forming method are preferable because a homogeneous PVA mold release film can be obtained with high productivity.

Hereinafter, a cast film-forming method or a melt-extrusion film-forming method for a PVA mold release film is described.

When a PVA mold release film is formed by the cast film-forming method or the melt-extrusion film-forming method, the above-mentioned film-forming stock solution is cast into a film form on a support such as a metal roll or a metal belt, heated to remove the solvent, and as a result, the solution is solidified to form a film. The solidified film is peeled off from the support, dried with a drying roll, a drying oven, or the like if necessary, further heat-treated if necessary, and wound up, and thus a roll-shaped elongated PVA mold release film can be obtained.

The volume of the PVA mold release film in the course of drying gradually decreases due to the volatilization of the solvent, etc. Therefore, if no tension is applied to the film, the film tends to shrink in both length and width. However, if the film is bound on a support, the film cannot shrink, so that tension occurs in the longitudinal and transverse directions with the advance of drying, and as a result, orientation of the molecular chain of PVA is generated.

Further, since the volatilization of the solvent, etc. occurs on the surface of the film, the content of the solvent is distributed in the thickness direction of the film during drying. Since the solvent volatilizes rapidly on the film surface, oriented PVA molecular chains are easily immobilized there. However, since the solvent content is high near the center in the thickness direction of the film, relaxation of PVA molecular chain orientation is more likely to occur there as compared with the film surface. Therefore, the birefringence index of the film surface tends to be higher than that of the vicinity of the center in the thickness direction.

Further, in the space between the support, the drying roll, and the conveying roll after being peeled off from the support, if the tension applied to the film is high, the orientation in the machine direction proceeds, if the tension is low, the orientation relaxation proceeds, and if the residence time between the support and the roll is long, the orientation relaxation in the transverse direction proceeds.

Therefore, a PVA mold release film of the present invention having controlled birefringence indexes in the machine direction and the transverse direction can be obtained by appropriately adjusting the drying speed on the support, namely, the temperature of the support surface and the contact time with the support, the tension applied to the film between the support, the drying roll, and the conveying roll, the residence time between the support, the drying roll, and the conveying roll, and the temperature of the drying roll and the drying oven.

The concentration of volatile components of the film-forming stock solution (concentration of volatile components such as solvents to be removed by volatilization or evaporation during film-forming) is preferably in the range of 50 to 90% by mass, and more preferably in the range of 55 to 80% by mass. When the concentration of volatile components is less than 50% by mass, the viscosity of the film-forming stock solution may become high, so that it may become difficult to form a film. On the other hand, it is unfavorable that the concentration of volatile components exceeds 90% by mass because if so, the viscosity becomes low and the thickness uniformity of a resulting film is likely to be impaired and it becomes difficult to control the birefringence index because the higher the concentration of volatile components, the more likely to occur the relaxation of PVA molecular chain orientation is.

The method for preparing the film-forming stock solution is not particularly limited, and examples thereof include a method of dissolving PVA and additives such as a plasticizer and a surfactant in a dissolution tank or the like, and a method of melt-kneading hydrous PVA using an extruder together with a plasticizer, a surfactant, and the like.

The film-forming stock solution generally is passed through a die lip of a die such as a T-die and is cast into a film form on a support such as a metal roll or a metal belt. The draft ratio at this time, that is, the ratio of the linear velocity of the support surface to the linear velocity in the flow direction of the film-forming stock solution when passing through the die lip is preferably in the range of 2 to 60. By adjusting the draft ratio to this range, it becomes easy to obtain a favorable birefringence index with a good film surface. When the draft ratio is excessively low, it tends to be difficult to obtain a favorable birefringence index. When the draft ratio is excessively high, it tends to be difficult to obtain a preferable birefringence index, and the thickness of the film tends to vary in the transverse direction. A more preferable range of the draft ratio is 2 to 50, a more preferable range is 3 to 40, and a particularly preferable range is 4 to 30.

The surface temperature of the support on which the film-forming stock solution is cast is preferably 40 to 120° C. When the surface temperature is lower than 40° C., the time required for drying tends to increase and productivity tends to decrease, and when it exceeds 120° C., abnormalities on the film surface such as foaming tend to occur, and it tends to be difficult to adjust the birefringence index. The surface temperature of the support is more preferably 50 to 110° C., and even more preferably 60 to 105° C.

The PVA mold release film peeled off from the support is further dried if necessary. The drying method is not particularly limited, and examples thereof include a method of keeping the film in contact with a drying oven or a drying roll. When drying with a plurality of drying rolls, it is preferable to alternately bring one side and the other side of the film into contact with the drying rolls in order to make both sides uniform. The temperature of the drying oven and the drying roll is preferably 40 to 110° C.

In addition, the PVA mold release film may be subjected to heat treatment if necessary. By performing the heat treatment, the strength, solubility in water, birefringence index, etc. of the film can be adjusted. The heat treatment temperature is preferably 60 to 160° C.

In the formation of a PVA mold release film, the film that has been cast into a film form on a support such as a metal roll or a metal belt gradually loses volatile matter as the film-forming process progresses, and the volume of the film also gradually decreases, accordingly. At this time, if the total draw ratio in the film-forming process, namely, the ratio of the linear velocity of the winding roll that winds the film into a roll to the linear velocity in the flow direction of the surface of the support on which the film-forming stock solution is cast, is larger than the shrinkage of the film in the longitudinal direction due to drying, tension in the flow direction is applied to the film, which affects the orientation of PVA molecules in the film. The preferable range of the total draw ratio in the present invention is 1.00 to 1.90. When the total draw ratio is excessively low, it tends to be difficult to obtain a film having the birefringence index of the present invention. Also, when the total draw ratio is excessively high, it tends to be difficult to obtain a film having the birefringence index of the present invention, and the problem that the effective width of the resulting film decreases is likely to occur. A more preferable range of the total draw ratio is 1.10 to 1.80, an even more preferable range is 1.2 to 1.7, and a particularly preferable range is 1.25 to 1.60.

The PVA mold release film produced in this manner is wound up into a roll form on a cylindrical core and moisture-proof packaged to afford a product.

[Method of Using PVA Mold Release Film]

When solidifying and molding artificial marble with a shaping apparatus such as a mold, disposing the PVA mold release film of the present invention between a stock solution and the shaping apparatus makes it possible to easily remove the artificial marble from the shaping apparatus, and the PVA mold release film can be easily removed from the artificial marble.

[Method of Manufacturing Artificial Marble]

A method for producing artificial marble in which artificial marble is continuously produced using the PVA mold release film of the present invention is also one embodiment of the present invention.

In the present invention, artificial marble may be, but is not necessarily limited to, a molded article produced by curing, with a shaping apparatus, a stock solution prepared by blending an additive such as an organic or inorganic filler, a polymerization catalyst, a crosslinking agent, an antioxidant, and an ultraviolet absorber with a prepolymer of thermosetting resin such as a polyester-based polymer, an acrylic-based polymer, a bisphenol-based polymer, a vinyl ester-based polymer, or an epoxy polymer.

Among the prepolymers, as described above, a polyester-based polymer, an acrylic-based polymer, or a mixture thereof is preferable because the effect of the present invention can be obtained more remarkably. That is, it is a preferred embodiment that the artificial marble contains at least one species selected from the group consisting of acrylic-based polymers and polyester-based polymers. Among the polyester-based polymers, unsaturated polyester-based polymers are preferable.

The filler to be blended in the artificial marble is not necessarily limited, and organic fillers such as beads, powder or the like of synthetic resin such as acrylic-based polymers and styrene-based polymers, and inorganic fillers such as aluminum hydroxide, aluminum oxide, calcium carbonate, calcium silicate, calcium aluminate, barium sulfate, calcium sulfate, magnesium hydroxide, silica, talc, and clay can be used.

As the polymerization catalyst and the crosslinking agent, those capable of polymerizing and crosslinking a prepolymer of thermosetting resin may be appropriately selected.

Further, besides the antioxidant and the ultraviolet absorber, additives such as an antibacterial agent, a slipping agent, and a mold release agent may be blended if necessary as long as the effects of the present invention are not impaired.

The method for continuously producing artificial marble using the PVA mold release film of the present invention is not necessarily limited, but examples thereof include a method comprising placing PVA mold release films on the opposite surfaces of a pair of endless belts, continuously feeding a stock solution as a raw material for artificial marble to between the PVA mold release films, and introducing the belts into a heating oven to continuously cure the stock solution, and a method comprising attaching a PVA mold release film onto an endless belt, continuously feeding a stock solution as a raw material for artificial marble on the PVA mold release film, placing another PVA mold release film on the stock solution, applying a sizing roll to the stock solution from above the PVA mold release film to adjust the thickness and simultaneously introducing them into a heating oven to continuously cure the stock solution.

The cured artificial marble is cut into an appropriate length and the surface is polished if necessary. The PVA mold release film may be peeled off before polishing, or may be removed while being swollen and dissolved with cooling/lubricating water supplied to the surface of the artificial marble during polishing. By the removal during polishing, it is possible to save the labor of peeling off the PVA mold release film. Therefore, the method for producing artificial marble comprising a step of peeling off the PVA mold release film by polishing the artificial marble is a preferred embodiment of the present invention.

EXAMPLES

Hereinafter, the present invention is specifically described with reference to examples, but the present invention is not limited to the following examples. The evaluation items and methods thereof for PVA mold release film and artificial marble are as follows.

(1) Birefringence Index of PVA Mold Release Film

The birefringence index of a PVA mold release film can be measured by the following method.

(A) Birefringence Index in the Machine Direction (MD) "$\Delta n(MD)$"

(i) At an arbitrary position in the machine direction (MD) of a PVA mold release film, strips with a size of MD×TD=2 mm×10 mm are cut out from the center (named position 0) and positions within 30 mm from both end parts (named positions 1 and 2) in the transverse direction (TD) of the film as shown in of FIG. 1(a), and each of the strips is sandwiched between PET films with a thickness of 100 μm, and further is sandwiched between wooden frames and attached to a microtome apparatus.

(ii) Next, the strip taken above is sliced at 10 μm intervals parallel to the machine direction (MD) of the strip as shown in of FIG. 1(b) (the PET film and the wooden frames are not shown). Thus, ten sliced pieces (MD×TD=2 mm×10 μm) for observation shown in FIG. 1(c) are prepared. Of these sliced to pieces, five sliced pieces having a smooth sliced surface and no slice thickness unevenness are selected, and each placed on a slide glass, and the slice thickness is measured with a microscope (manufactured by KEYENCE Corporation). The observation is performed with a field of view at 10 times the ocular and 20 times the objective (total 200 times).

(iii) Next, the sliced piece is tilted such that the sliced surface can be observed as shown in of FIG. 1(d), placed on a slide glass with the sliced surface facing upward, and sealed with a cover glass and silicone oil (refractive index: 1.04). The retardation of the five sliced pieces is measured using a two-dimensional photoelasticity evaluation system "PA-micro" (manufactured by Photonic Lattice, Inc.).

(iv) With the retardation distribution of each sliced piece displayed on the measurement screen of the "PA-micro", a line α perpendicular to the surface of the original film so as to cross the sliced piece, and line analysis is performed on the line segment α, so that the retardation distribution data in the thickness direction of the film is taken. The observation is performed with a field of view at 10 times the ocular and 20 times the objective (total 200 times). Further, in order to suppress an error due to a change in the position where the line segment α passes on the sliced piece, the average value of the retardation is adopted with the line width set to 300 pixels.

(v) The value of the retardation distribution in the thickness direction of the film obtained above is divided by the thickness measured with a microscope to obtain the birefringence index $\Delta n(MD)$ distribution in the thickness direction of the film, and obtain the average value of the birefringence index $\Delta n(MD)$ distribution in the thickness direction of the film. Further, the average value of the birefringence index $\Delta n(MD)$ distribution in the thickness direction of each film obtained for the five sliced pieces is calculated.

The average value of the birefringence index in the machine direction at the center in the transverse direction of the PVA mold release film is $\Delta n(MD)_0$, the average value of the birefringence index in the machine direction at one end part in the transverse direction of the PVA mold release film is $\Delta n(MD)_1$, and the average value of the birefringence index in the machine direction at the other end part in the transverse direction of the PVA mold release film is $\Delta n(MD)_2$.

(B) Birefringence Index in the Transverse Direction (TD) "$\Delta n(TD)$"

(i) At an arbitrary position in the machine direction (MD) of a PVA mold release film, a strip with a size of MD×TD=10 mm×2 mm is cut out from the center in the transverse direction (TD) of the film as shown in of FIG. 2(a), and the strip is sandwiched between PET films with a thickness of 100 μm, and further is sandwiched between wooden frames and attached to a microtome apparatus.

(ii) Next, the strip taken above is sliced at 10 μm intervals parallel to the transverse direction (TD) of the strip as shown in of FIG. 2(b) (the PET film and the wooden frames are not shown). Thus, ten sliced pieces (MD×TD=10 μm×2 mm) for observation shown in FIG. 2(c) are prepared. Of these sliced to pieces, five sliced pieces having a smooth sliced surface and no slice thickness unevenness are selected, and each placed on a slide glass, and the slice thickness is measured with a microscope (manufactured by KEYENCE Corporation). The observation is performed with a field of view at 10 times the ocular and 20 times the objective (total 200 times).

(iii) Next, the sliced piece is tilted such that the sliced surface can be observed as shown in of FIG. 2(d), placed on a slide glass with the sliced surface facing upward, and sealed with a cover glass and silicone oil (refractive index: 1.04). The retardation of the five sliced pieces is measured using a two-dimensional photoelasticity evaluation system "PA-micro" (manufactured by Photonic Lattice, Inc.).

(iv) With the retardation distribution of each sliced piece displayed on the measurement screen of the "PA-micro", a line β perpendicular to the surface of the original film so as to cross the sliced piece, and line analysis is performed on the line segment β, so that the retardation distribution data in the thickness direction of the film is taken. The observation is performed with a field of view at 10 times the ocular and 20 times the objective (total 200 times). Further, in order to suppress an error due to a change in the position where the line segment β passes on the sliced piece, the average value of the retardation is adopted with the line width set to 300 pixels.

(v) The value of the retardation distribution in the thickness direction of the film obtained above is divided by the thickness measured with a microscope to obtain the birefringence index $\Delta n(TD)$ distribution in the thickness direction of the film, and obtain the average value of the birefringence index $\Delta n(TD)$ distribution in the thickness direction of the film. The average values of the birefringence index $\Delta n(TD)$ distribution in the thickness direction of each film obtained for the five sliced pieces are further averaged and defined as "$\Delta n(TD)_0$".

(2) Complete Dissolution Time of PVA Mold Release Film in Deionized Water at 10° C.

The complete dissolution time of a PVA mold release film in deionized water at 10° C. was determined by the method described in [Complete dissolution time of PVA mold release film] above.

(3) Wrinkles on the Surface of Artificial Marble

In the production of artificial marble described later, wrinkles generated on the surfaces of both end parts of the artificial marble when the artificial marble was continuously produced using a PVA mold release film were evaluated according to the following criteria.

AA: No wrinkles are found on both end parts of the artificial marble.

AB: Wrinkles that can be easily removed by polishing are found only on one end part of the artificial marble.

BB: Wrinkles that can be easily removed by polishing are found on both end parts of the artificial marble.

CC: Wrinkles that cannot be easily removed by polishing are found on both end parts of the artificial marble.

Example 1

(1) Production of PVA Mold Release Film

A film-forming stock solution with a volatile component concentration of 68% by mass composed of 100 parts by mass of a PVA (degree of saponification: 88 mol %, degree of polymerization: 1000) obtained by saponifying polyvinyl acetate, 9 parts by mass of glycerin, 0.1 parts by mass of diethanolamide laurate, and water was discharged into a film form from a T-die onto a first drying roll (surface temperature: 80° C., peripheral speed: 11 m/min), and was dried on the first drying roll by blowing hot air at 85° C. against the entire non-contact surface of the first drying roll. Then, the dried film was peeled off from the first drying roll, and was dried with a second and the following rolls at a roll surface temperature of about 60° C. such that one surface and the other surface of the PVA film alternately come into contact with the drying rolls. Finally, the PVA film was subjected to heat treatment with a final drying roll (heat treatment roll) having a surface temperature of 110° C., and then was wound up to afford a PVA mold release film (thickness: 35 µm, width: 1900 mm). The ratio of the linear velocity of the surface of the first drying roll to the linear velocity of the film-forming stock solution in its flow direction at the die lip, namely, the draft ratio, was 4.8, and the ratio of the linear velocity of the winding roll that winds a film into a roll form to the linear velocity of the surface of the first drying roll, namely, the total draw ratio, was 1.41.

The birefringence index of the obtained PVA mold release film was first measured at the center of the film in the transverse direction. As a result, the average value [$\Delta n(TD)_0$] in the thickness direction of the birefringence index in the transverse direction was $1.9 \times 10^{-3}$, and the average value [$\Delta n(MD)_0$] in the thickness direction of the birefringence index in the machine direction was $4.2 \times 10^{-3}$. Next, the end part of the film located on the right side viewed in the flow direction of the film from the above was measured. As a result, the average value [$\Delta n(MD)_1$] in the thickness direction of the birefringence index in the machine direction was $4.4 \times 10^{-3}$. Further, the end part of the film located on the left side viewed in the flow direction of the film from the above was measured. As a result, the average value [$\Delta n(MD)_2$] in the thickness direction of the birefringence index in the machine direction was $4.4 \times 10^{-3}$.

In addition, the complete dissolution time of the obtained PVA mold release film in deionized water at 10° C. was 52 seconds.

(2) Production of Artificial Marble

The obtained PVA mold release film was allowed to stand in a room at 20° C. and 65% RH for 2 weeks to stabilize the water content contained in the PVA mold release film.

In the indoor environment, while the PVA mold release film was continuously put on one end of an endless stainless steel belt, it was nipped with a roll to attach the film to the belt, and then 285 parts by mass of methyl methacrylate (MMA), 100 parts by mass of methacrylic resin (PMMA, trade name "PARABEADS", manufactured by Kuraray Co., Ltd.), 15 parts by mass of 1,3-butylene glycol dimethacrylate (BG), and 600 parts by mass of aluminum hydroxide powder (Hygilite, manufactured by Showa Denko K.K.) were mixed as an acrylic-based monomer mixture. The acrylic-based monomer mixture obtained by degassing under vacuum was adjusted to 30° C. and continuously fed into an in-line mixer at 2.0 kg/min with a metering pump. At the same time, a polymerization initiator tertiary butyl peroxyneodecanoate (trade name "PERBUTYL ND", manufactured by NOF Corporation) was fed at a ratio of 8 g per 1 kg of the acrylic-based monomer mixture and mixed, and then the resulting mixture was fed onto the PVA mold release film-attached endless stainless steel belt, and cast in a plate form such that the thickness of the liquid was 11 mm. A PVA mold release film was put thereon and continuously conveyed into a hot air circulation type polymerization heating oven kept at a fixed temperature of 75° C. shown in FIG. 3, whereby the mixture was polymerized and cured to afford acrylic artificial marble.

When the surface of the obtained acrylic artificial marble was observed with the PVA mold release films attached, almost no wrinkles at both end parts were observed. Next, as an evaluation of water washability from the surface of the artificial marble, the surface of the obtained acrylic artificial marble was polished while spraying water with the PVA mold release films attached. As a result, the PVA mold release films could be easily dissolved and removed. The results are shown in Table 1.

Example 2

A PVA mold release film was obtained in the same manner as in Example 1 except that the degree of saponification of the PVA in Example 1 was changed from 88 mol % to 99 mol % and the temperature of hot air blown to the non-contact surface of the first drying roll was changed from 85° C. to 95° C. In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1. The "00" of the complete dissolution time (s) in Example 2 in Table 1 indicates that the PVA mold release film was not completely dissolved in the deionized water.

Example 3

A PVA mold release film was obtained in the same manner as in Example 2 except that the PVA was changed from the unmodified PVA with a degree of saponification of 88 mol % to a PVA obtained by saponifying a modified polyvinyl acetate obtained by copolymerizing 4 mol % of acrylamide propanesulfonic acid (degree of saponification: 99 mol %, degree of polymerization: 1000). In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1.

Example 4

A PVA mold release film was obtained in the same manner as in Example 1 except that regarding the hot air blown to the non-contact surface of the first drying roll in Example 1, where the nozzle for blowing the hot air was divided into three equal parts in the transverse direction, the temperature of the hot air was changed from 85° C. to 100° C. for the side parts except the center part of the nozzle. In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1.

Example 5

A PVA mold release film was obtained in the same manner as in Example 1 except that regarding the hot air blown to the non-contact surface of the first drying roll in Example 1, where the nozzle for blowing the hot air was divided into three equal parts in the transverse direction, the temperature of the hot air was changed from 85° C. to 65° C. for one of the side parts except the center part of the nozzle. In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1.

Comparative Example 1

A PVA mold release film was obtained in the same manner as in Example 1 except that the surface temperature of the first drying roll in Example 1 was changed from 80° C. to 70° C., the temperature of the hot air blown to the non-contact surface of the first drying roll was changed from 85° C. to 75° C., the linear velocity of the surface of the first drying roll was changed to one half that in Example 1, and the total draw ratio was changed to 1.01. In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1.

Comparative Example 2

A PVA mold release film was obtained in the same manner as in Example 1 except that the total draw ratio in Example 1 was changed to 1.03. In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1.

Comparative Example 3

A PVA mold release film was obtained in the same manner as in Example 1 except that the total draw ratio in Comparative Example 2 was changed to 1.33. In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1.

Comparative Example 4

A PVA mold release film was obtained in the same manner as in Example 1 except that the draft ratio in Comparative Example 1 was changed to 3.8. In the same manner as in Example 1, the complete dissolution time of the obtained PVA mold release film in deionized water at 10° C. was measured, the surface of the acrylic artificial marble was observed, and the water washability from the surface of the artificial marble was evaluated. The results obtained are shown in Table 1.

TABLE 1

|  | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Film thickness (μm) | 35 | 35 | 35 | 35 | 35 | 35 | 35 | 35 | 35 |
| Film width (mm) | 1900 | 1900 | 1900 | 1900 | 1900 | 1900 | 1900 | 1900 | 1900 |
| Degree of saponification (mol %) | 88 | 99 | 99 | 88 | 88 | 88 | 88 | 88 | 88 |
| Modification | None | None | AMPS | None | None | None | None | None | None |
| $\Delta n(TD)_0$ ($\times 10^{-3}$) | 1.9 | 1.4 | 1.5 | 1.8 | 1.9 | 4.9 | 1.2 | 0.9 | 4.0 |
| $\Delta n(MD)_0$ ($\times 10^{-3}$) | 4.2 | 3.2 | 3.8 | 4.0 | 4.1 | 6.9 | 1.2 | 2.9 | 6.4 |
| $\Delta n(MD)_1$ ($\times 10^{-3}$) | 4.4 | 3.5 | 4.2 | 3.8 | 4.3 | 7.0 | 1.2 | 3.1 | 6.9 |
| $\Delta n(MD)_2$ ($\times 10^{-3}$) | 4.4 | 3.4 | 4.3 | 3.9 | 5.8 | 7.1 | 1.2 | 3.0 | 7.0 |
| Complete dissolution time (sec) | 52 | ∞ | 21 | 54 | 53 | 52 | 52 | 53 | 51 |
| Marble surface wrinkles | AA | AA | AA | BB | AB | Impossible | CC | CC | CC |
| Water washability | A | B | A | A | A | A | A | A | A |

Marble surface wrinkles: AA = No wrinkles are found on both end parts; AB = Wrinkles that can be easily removed by polishing are found only on one end part; BB = Wrinkles that can be easily removed by polishing are found on both end parts; CC = Wrinkles that cannot be easily removed by polishing are found on both end parts.

Water washability: A = removable by washing with water, B = not removable by washing with water.

DESCRIPTIONS OF SYMBOLS

1: heating oven
2: circulation blower
3: heat exchanger
4, 4': belt pulley
5: endless stainless steel belt
6: partition chamber
7: PVA mold release film (for belt attachment)
8: PVA mold release film (for prevention of acrylic-based monomer mixture volatilization)
9: hose for feeding acrylic-based monomer mixture
10: nip roll

The invention claimed is:

1. A polyvinyl alcohol mold release film for artificial marble molding use, which is to be placed between a stock solution that serves as a raw material for artificial marble and a shaping apparatus when the stock solution is fed to the shaping apparatus, solidified and molded, the mold release film being characterized by being a polyvinyl alcohol film and satisfying the following formula (1), $$4.6\times10^{-3} \geq \Delta n(MD)_0 - 1.4\times10^{-3} \geq \Delta n(TD)_0 \geq 1.0\times10^{-3} \quad (1)$$

in the formula (1), $\Delta n(MD)_0$ represents a value determined from a birefringence index of the polyvinyl alcohol mold release film in the machine direction at a center part of a transverse direction of the film by averaging the birefringence index along a thickness direction of the film, and $\Delta n(TD)_0$ represents a value determined from a birefringence index of the polyvinyl alcohol mold release film in the transverse direction at the center part of the transverse direction of the film by averaging the birefringence index along the thickness direction of the film.

2. The polyvinyl alcohol mold release film for artificial marble molding use according to claim 1, wherein the film satisfies the following formulas (2) to (4), $$3.0\times10^{-3} \geq \Delta n(MD)_1 - \Delta n(MD)_0 \geq 0.01\times10^{-3} \quad (2)$$

$$3.0\times10^{-3} \geq \Delta n(MD)_2 - \Delta n(MD)_0 \geq 0.01\times10^{-3} \quad (3)$$

$$1.5\times10^{-3} \geq |\Delta n(MD)_2 - \Delta n(MD)_1| \quad (4)$$

in the formulas (2) and (3), $\Delta n(MD)_0$ has the same meaning as in the formula (1), and in the formulas (2) and (4), $\Delta n(MD)_1$ represents a value determined from a birefringence index of the polyvinyl alcohol mold release film in the machine direction at one end part of the transverse direction of the film by averaging the birefringence index along the thickness direction of the film, and in the formulas (3) and (4), $\Delta n(MD)_2$ is a value determined from a birefringence index of the polyvinyl alcohol mold release film in the machine direction at the other end part of the transverse direction of the film by averaging the birefringence index along the thickness direction of the film.

3. The polyvinyl alcohol mold release film for artificial marble molding use according to claim 1, wherein a complete dissolution time when immersing the film in deionized water at 10° C. is within 300 seconds.

4. The polyvinyl alcohol mold release film for artificial marble molding use according to claim 1, wherein the degree of saponification of the polyvinyl alcohol forming the film is 64 to 93 mol %.

5. The polyvinyl alcohol mold release film for artificial marble molding use according to claim 1, wherein the artificial marble comprises at least one species selected from the group consisting of an acrylic-based polymer and a polyester-based polymer.

6. The polyvinyl alcohol mold release film for artificial marble molding use according to claim 1, wherein the width of the film is 1000 mm or more.

7. A method for producing artificial marble, wherein the artificial marble is continuously produced using the polyvinyl alcohol mold release film for artificial marble molding use according to claim 1.

* * * * *